United States Patent

Itami et al.

[11] Patent Number: 6,011,764
[45] Date of Patent: Jan. 4, 2000

[54] OPTICAL DISK AND OPTICAL DISK APPARATUS

[75] Inventors: Satoshi Itami; Masaru Nakahara; Masahiro Nakada; Hiroshi Suzuki; Kenichi Utsumi, all of Kawasaki, Japan

[73] Assignee: Fujitsu Limited, Kawasaki, Japan

[21] Appl. No.: 09/034,409

[22] Filed: Mar. 4, 1998

Related U.S. Application Data

[62] Division of application No. 08/683,174, Jul. 18, 1996, Pat. No. 5,777,965, which is a continuation of application No. 08/365,169, Dec. 28, 1994, Pat. No. 5,617,393, which is a continuation of application No. 08/033,778, Mar. 17, 1993, abandoned.

[30] Foreign Application Priority Data

Mar. 18, 1992 [JP] Japan .................................. 4-062606

[51] Int. Cl.[7] ...................................................... G11B 7/00
[52] U.S. Cl. .................................. 369/58; 369/47; 369/59
[58] Field of Search .................................. 369/47, 48, 49, 369/50, 53, 54, 58, 59, 60, 32, 13

[56] References Cited

U.S. PATENT DOCUMENTS

| | | | |
|---|---|---|---|
| 4,916,680 | 4/1990 | Oldham | 369/13 |
| 4,958,314 | 9/1990 | Imai et al. | 369/900 |
| 5,023,854 | 6/1991 | Satoh et al. | 369/32 |
| 5,132,954 | 7/1992 | Kulakowski et al. | 369/48 |
| 5,247,494 | 9/1993 | Ohno et al. | 369/13 |
| 5,270,877 | 12/1993 | Fukushima et al. | 360/48 |
| 5,309,425 | 5/1994 | Yamamuro et al. | 369/124 |

FOREIGN PATENT DOCUMENTS 4-188466  7/1992  Japan .

*Primary Examiner*—Muhammad Edun
*Attorney, Agent, or Firm*—Armstrong, Westerman, Hattori, McLeland & Naughton

[57] ABSTRACT

An optical disk includes a user accessible area having a plurality of blocks and flag data recorded on the optical disk. The flag data indicates whether or not each of the blocks is in an erased state in which there is no recorded data. A flag area stores the flag data, and area data indicating that the optical disk has the flag area is recorded on the optical disk.

12 Claims, 14 Drawing Sheets

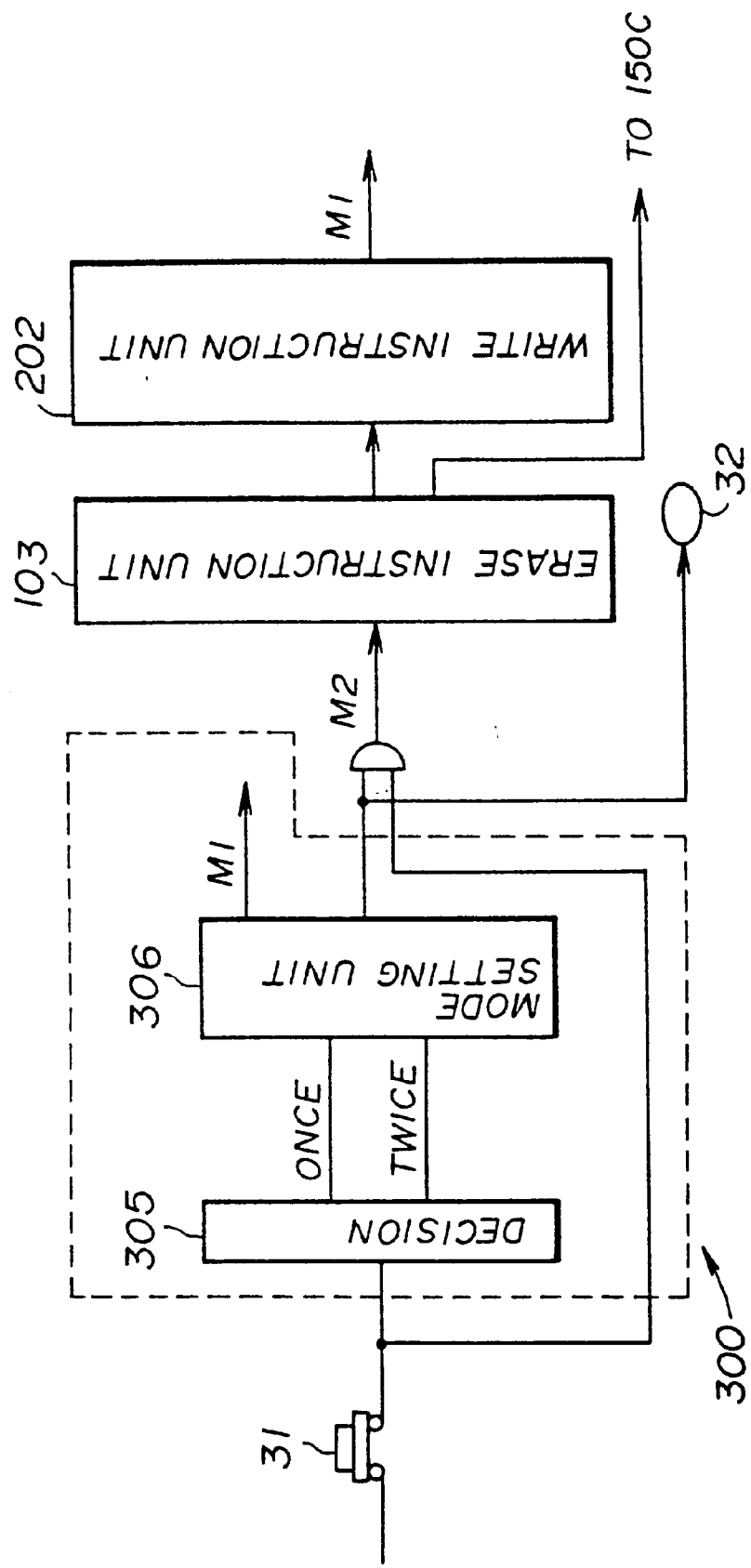

OPTICAL DISK AND OPTICAL DISK APPARATUS

This application is a divisional of Ser. No. 08/683,174 filed Jul. 18, 1996 now U.S. Pat. No. 5,777,965 which is a continuation of Ser. No. 08/365,169, filed Dec. 28, 1994, now U.S. Pat. No. 5,617,393, which is a continuation of Ser. No. 08/033,778 filed Mar. 17, 1993, now abandoned.

BACKGROUND OF THE INVENTION

1. Field of the Invention

The present invention generally relates to optical disks and optical disk apparatuses, and more particularly to an optical disk and an optical disk apparatus in which the frequency of erasing performed immediately before writing is reduced.

2. Description of the Related Art

FIG. 1 is a diagram showing an overview of a conventional optical disk apparatus. Data is written on an optical disk 1 as follows. A bias magnetic field H is applied to the optical disk 1. In this case, a spot of a laser beam emitted from an optical head 2 is continuously projected onto a block on the optical disk 1. Thereby, the block is magnetized in the direction of the bias magnetic field H, so that data recorded on the block is erased. In order to write data on the above block, the bias magnetic field H is applied to the block in the reverse direction. When the optical disk 1 performs one revolution the laser beam spot is projected onto the block again. Thereby, the block is magnetized in the direction the reverse of the direction in the erased state, so that data can be written on the block. In the above-mentioned manner, the erasing operation must be performed before writing of data is performed.

FIG. 2 is a block diagram showing the format of the optical disk 1 prescribed in the ISO 10090 standard, the disclosure of which is hereby incorporated by reference. The optical disk 1 has a user accessible area 10 and a user inaccessible area 20. A user is free to write data or programs necessary to handle the optical disk 1 on the optical disk 1. The user inaccessible area 20 allows only the manufacturer of the optical disk 1 to write data necessary for disk management. That is, the user is not allowed to write data on the user inaccessible area 20.

More particularly, the user accessible area 10 accessible by the user in a normal way (mode) is defined between the third track and the 9996th track. The user accessible area 10 shown in FIG. 2 includes a RAM (rewritable) area 10a and a ROM area (read only area) 10b. The RAM area 10a is closer to the inner portion of the optical disk 1 than the ROM area 10b. The user can write data on the RAM area 10a and read data therefrom. The user is only allowed to read data from the ROM area 10b. The optical disk having the above user accessible area 10 is called a partial ROM type optical disk. It is also possible to design the entire user accessible area 10 so that it is comprised of only the RAM area 10a or the ROM area 10b.

Two defect management areas (DMA) 20m are provided so that the user accessible area 10 is sandwiched between them. Information necessary for disk management, such as a disk production number and date, is recorded on the defect management areas 20m. An inner control track area 20c is provided adjacent to the defect management area 20m located in the inner portion of the optical disk 1. An outer control track area 20c is provided adjacent to the disk management area 20m located in the outer portion of the optical disk 1 is provided. Data concerning the allocation of the RAM area 10a and the ROM area 10b is recorded on the inner and outer control track areas 20c, respectively.

In the conventional data writing process, the erasing operation is performed first, and the data writing operation on is performed second after the optical disk 1 is rotated once. Hence, an overwrite operation cannot be performed, and it thus takes a long time to write data on the optical disk 1.

In order to eliminate the above problem, the following improvements have been proposed. The first proposed improvement is to use two laser beam spots, one of the two spots being used for erasing and the other being used for writing. The second proposed improvement is to employ a magnetic modulation method using a magnetic floating head. The third proposed improvement is to use an optical disk having a multi-layer structure.

However, the first proposed improvement needs a complex optical system, and hence the optical disk apparatus is expensive. The second proposed improvement needs a process for floating the magnetic head on the side of the optical disk 1 opposite to the optical head 2. The above process cannot be interchanged with that of the conventional art. Further, head crash may occur as in the case of magnetic disks. Furthermore, it is necessary to provide a mechanism for moving the magnetic floating head. The third proposed improvement cannot provide any multi-layer structure which can be put to practical use.

SUMMARY OF THE INVENTION

It is a general object of the present invention to provide an optical disk and an optical disk apparatus in which the above disadvantages are eliminated.

A more specific object of the present invention is to provide a less-expensive optical disk and a less-expensive optical disk apparatus in which the time necessary to write data is reduced while the interchangeability with conventional optical disks can be maintained.

The above objects of the present invention are achieved by an optical disk comprising:

a user accessible area having a plurality of blocks;

flag data recorded on the optical disk, the flag data indicating whether or not each of the blocks is in an erased state in which there is no recorded data;

a flag area storing the flag data; and area data recorded on the optical disk, the area data indicating that the optical disk has the flag area.

The above objects of the present invention are also achieved by an optical disk apparatus for an optical disk including: a user accessible area having a plurality of blocks; flag data recorded on the optical disk, the flag data indicating whether or not each of the blocks is in an erased state in which there is no recorded data; a flag area storing the flag data; and area data recorded on the optical disk, the area data indicating that the optical disk has the flag area, the optical disk apparatus comprising:

decision means for determining whether or not the optical disk has the flag area by referring to the area data;

reference means, coupled to the decision means, for referring to the flag data in the flag area in response to a write command sent from an external device coupled to the optical disk apparatus;

erase instruction means, coupled to the decision means and the reference means, for generating an erase instruction with respect to a write subject block when the decision unit determines that the optical disk does not have the flag data, or when the reference means refers to the flag data indicating that the write subject block is not in the erased state;

first write instruction means, coupled to the reference means and the erase instruction means, for generating a first write instruction with respect to the write subject block when the erase instruction has been executed or when the reference means refers to the flag data indicating that the write subject block is in the erased state; and engine means, coupled to the erase instruction means and the first write instruction means, for performing an erasing and writing operation on the optical disk in response to the erase instruction and the first write instruction.

BRIEF DESCRIPTION OF THE DRAWINGS

Other objects, features and advantages of the present invention will become apparent from the following detailed description when read in conjunction with the accompanying drawings, in which:

FIG. 9 is a block diagram of an essential part of the second embodiment of the present invention;

DESCRIPTION OF THE PREFERRED EMBODIMENTS

Figure 3:
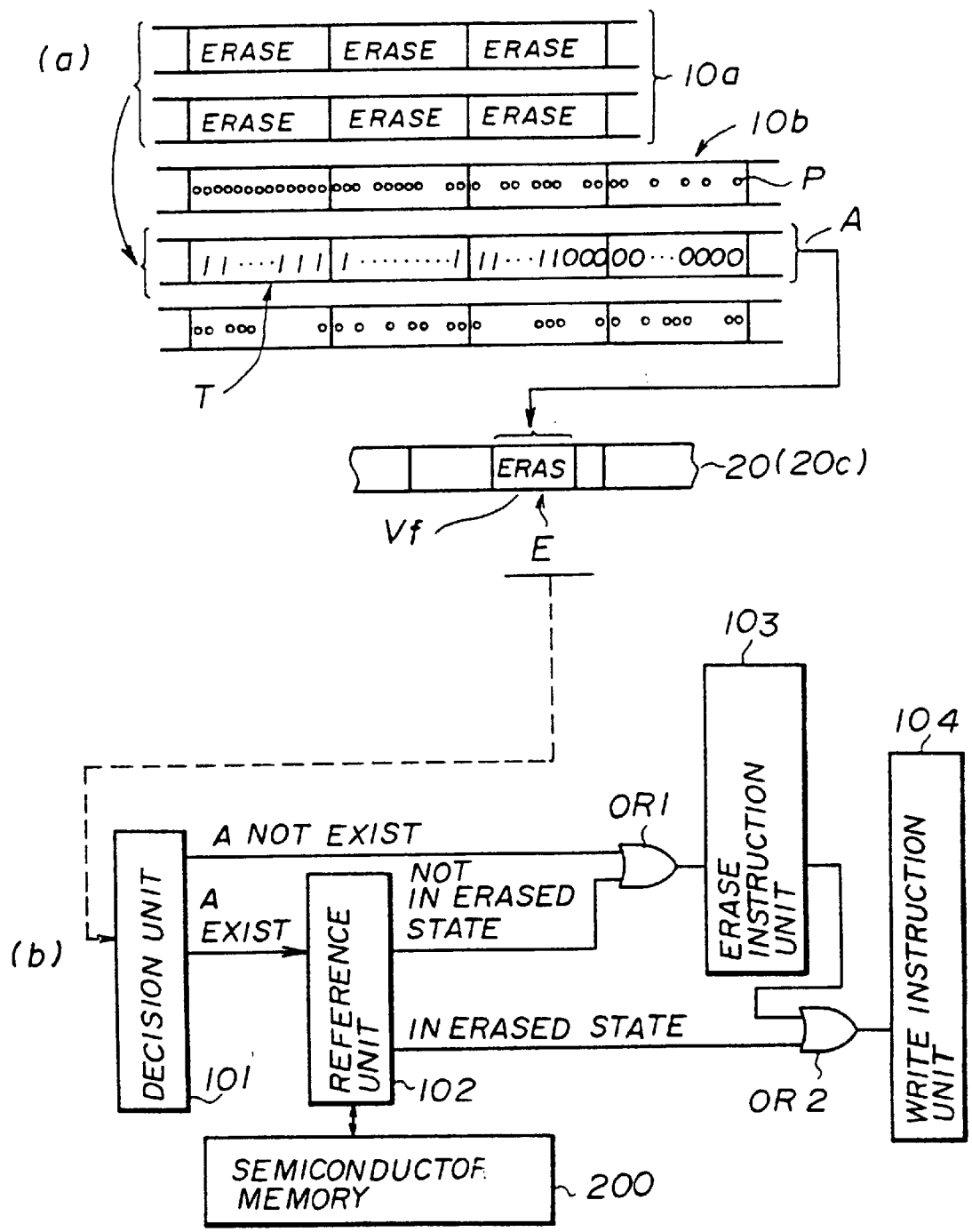
FIG. 3 is a block diagram of an overview of the present invention.

Referring to FIG. 3, an optical disk shown in (a) of FIG. 3 has flag data T, a flag area A and area data E. The flag data T indicates whether or not each block in the RAM area 10a is erasable. The flag data T is stored in a table. The flag area A stores the flag data T. The area data E indicates that the optical disk has the flag area A. The entire user accessible area except for the flag area A is initialized so as to be in the erased state. The area data E is arranged so that the user can easily erase data stored in the area data E. For example, the area data E is stored in a portion other than the user accessible area or the ROM area 10b which is not allowed to write data by the user.

As shown in (b) of FIG. 3, an optical disk apparatus for recording data on the above optical disk and reproducing data therefrom comprises a decision unit 101, a reference unit 102, an erase instruction unit 103, and a write instruction unit 104. The decision unit 101 determines whether or not the optical disk has the flag area A. The reference unit 102 refers to the flag data T in the flag area A in response to a write instruction to a block from a host computer (not shown in FIG. 3), when the decision unit 101 concludes that the optical disk has the flag area A. The erase instruction unit 103 generates an erase instruction when the decision unit 101 does not confirm the presence of the area data E or when the reference unit 102 makes a decision, by referring to the flag data T related to a write subject block, that the write subject block needs erasing. The write instruction unit 104 generates a write instruction when erasing by the erase instruction unit 103 is completed or when the reference unit 102 makes a decision, by referring to the flag data T related to the write subject block, that the subject write block does not need erasing.

The flag data T is loaded in a semiconductor memory 200 when the optical disk is loaded in the optical disk apparatus. The reference unit 102 refers to the flag data T loaded in the semiconductor memory 200.

In order to indicate that the write subject block is not in the erasable state after writing of data, a rewrite instruction unit 201 updates the flag data T stored in the semiconductor memory 200, as will be described in detail later. The updated flag data T is written into the flag area A of the optical disk in an idle time between access operations or immediately before disk ejection.

According to the present invention, it is determined, in response to the write instruction, whether or not the write subject block is in the erased state by referring to the flag data T in the optical disk apparatus (disk drive). When it is determined that the write subject block is in the erased state, data is written on the write subject block without performing the erasing operation. Hence, it is possible to reduce the time necessary to write data on the optical disk.

Figure 1:
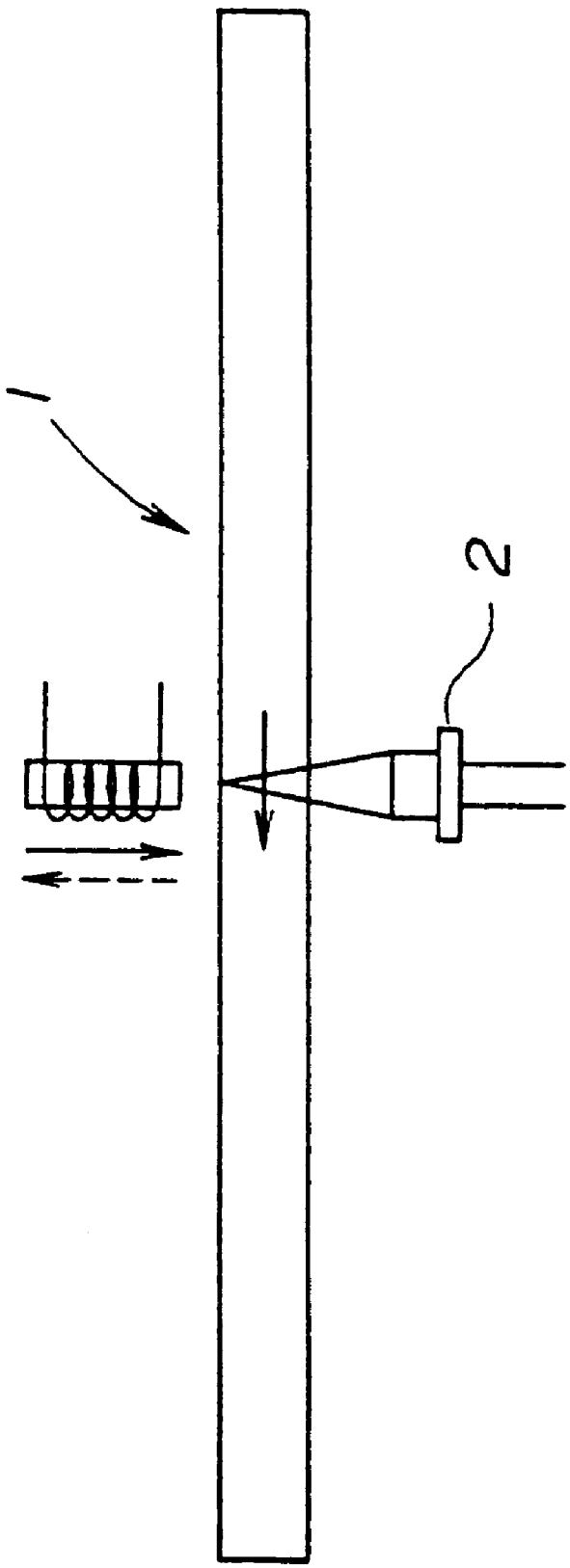
FIG. 1 is a block diagram of an overview of a conventional optical disk apparatus.
Figure 2:
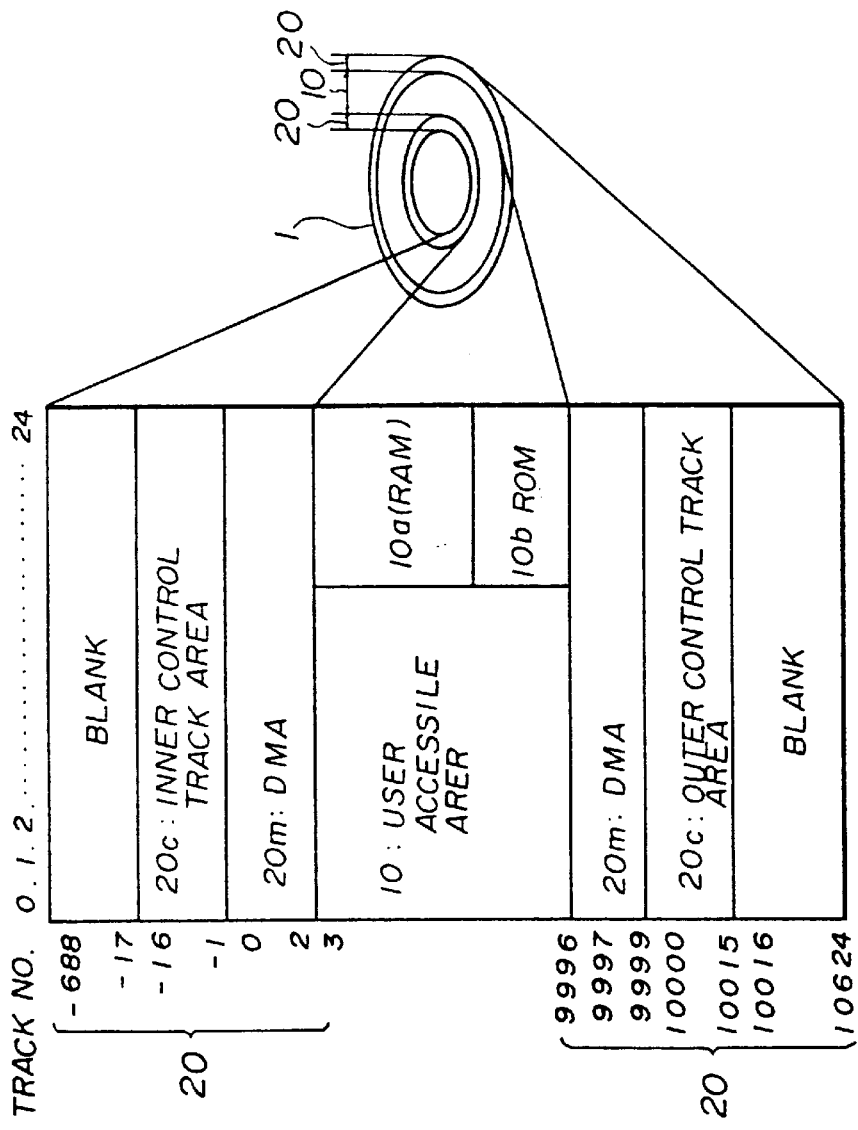
FIG. 2 is a diagram showing the format of the optical disk prescribed in the ISO 10090 standard.

A further description will now be given of the optical disk according to the present invention. Referring to FIG. 3, the entire user accessible area 10 except for the ROM area 10b is in the erased state. The user accessible area 10 is segmented into a plurality of blocks. The flag data T indicates whether or not each block is in the erased state. For example, the flag data T contains one magneto-optical bit assigned to one block. The bit "1" indicates that the corresponding block is in the erased state, and the bit "0" indicates that the corresponding block is not in the erased state. The optical disk 1 shown in FIG. 2 has approximately 100,000 tracks, which are equal to 250,000 blocks. When one bit of the flag data T is assigned to one block, the flag data T is data of 31,250 (=250,000/8) bytes. The bits of the flag data T are formed by pits in the ROM area 10b. The flag data T can be duplicated in the same flag area A in order to improve reliability.

The area data E, which indicates whether or not the flag area A is present, is recorded on one or both of the control track areas 20c, which store information concerning the allocation of the RAM area 10a and the ROM area 10b. As has been described previously, the user is not allowed to access the control track areas 20c. In this manner, it is possible to prevent the area data E from being mistakenly destroyed.

For example, as shown in (a) of FIG. 3, the area data E is written into a vender unique field Vf in one block in the control track 20c. In this manner, the area data E cannot be destroyed in any optical disks that conform to the ISO 10090 standard. It is also possible to provide the flag area A in the ROM area 10b. In this manner, it is possible to prevent the user from mistakenly writing data into the flag area A.

The specification of the area data E is not limited. For example, characters, such as "ERAS", or the address of the flag area A can be formed on the optical disk by a stamper.

Figure 4:
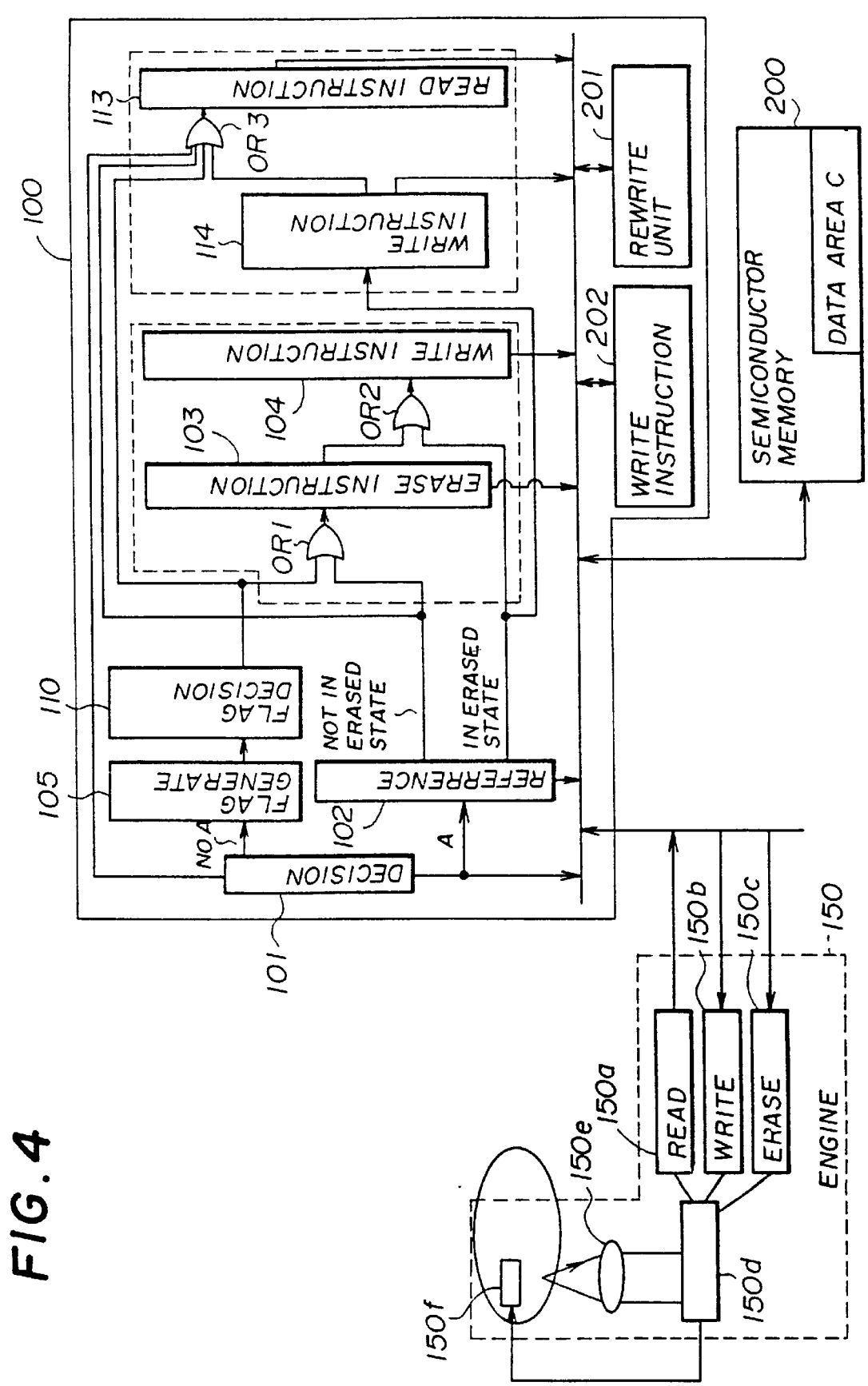
FIG. 4 is a block diagram of a first embodiment of the present invention.
Figure 5:
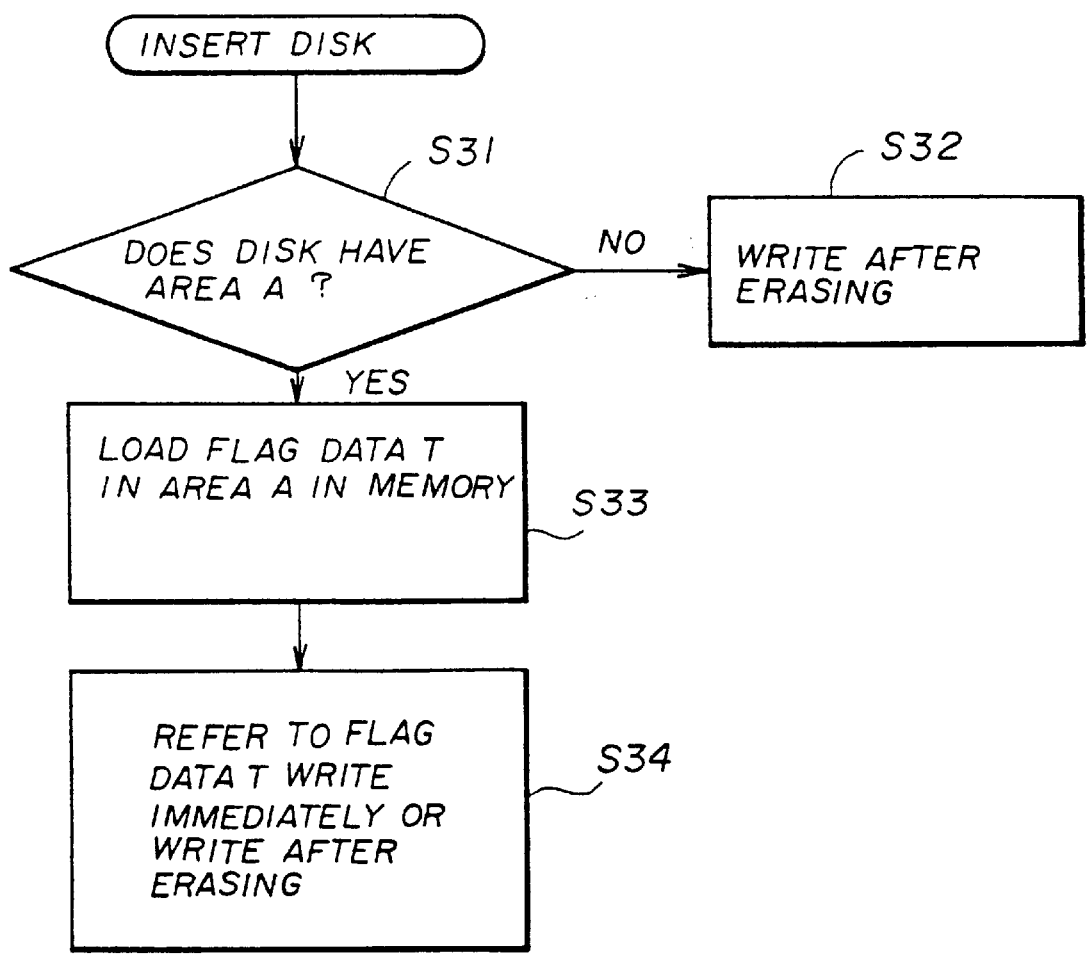
FIG. 5 is a flowchart illustrating the operation of the first embodiment of the present invention.

FIG. 4 is a block diagram of an optical disk apparatus for recording data on an optical disk 1A formed in the above manner and reproducing data from the optical disk 1A according to an embodiment of the present invention. In FIG. 4, parts that are the same as parts shown in FIG. 3 are given the same reference numbers. FIG. 5 is a flowchart of a control procedure performed when the optical disk 1A is loaded in the optical disk apparatus.

The optical disk apparatus shown in FIG. 4 is made up of a controller 100, an engine unit 150, and the semiconductor memory 200.

The controller 100 includes the decision unit 101, the reference unit 102, the erase instruction unit 103 and the write instruction unit 104, which units are also illustrated in FIG. 3. Further, the controller 100 includes a flag generator 105, a flag decision unit 110, a read instruction unit 113, a write instruction unit 114, a rewrite instruction unit 201, and a write instruction unit 202. In practice, the controller 100 is formed with, for example, a central processing unit (CPU), and the structural elements of the controller 100 shown in FIG. 4 are realized by execution of a program by the CPU.

The engine unit 150 includes a read unit 150a, a write unit 150b, an erase unit 150c, a driver unit 150d, an optical system 150e, a magnetic head system 150f, and an actuator for moving the optical and magnetic systems (not shown for the sake of simplicity), as in the case of a conventional engine unit. A disk driving mechanism for rotating the optical disk 1A is not shown for the sake of simplicity.

Referring to FIGS. 4 and 5, when the optical disk 1A is loaded in the optical disk apparatus, the decision unit 101 of the controller 100 determines whether or not the optical disk 1A has the flag area A by referring to the area data E in step S31 shown in FIG. 5. When it is determined, in step S31, that the optical disk 1A does not have the flag area A, writing of data into the optical disk 1A is performed after the erasing operation is performed in the same manner as the conventional optical disk apparatus. In this case, the decision unit 101 makes the flag generator 105 generate a flag B indicating that the erasing operation should be performed in step S32.

When it is determined, in step S31, that the optical disk 1A has the flag area A, the decision unit 101 activates the read unit 150a of the engine unit 150, which reads the flag data T from the flag area A formed on the optical disk 1A and writes the read flag data T into the semiconductor memory 200 in step S33. As will be described later, the write instruction unit 202 refers to the flag data T stored in the semiconductor memory 200 in order to generate the write instruction in step S34.

Figure 6:
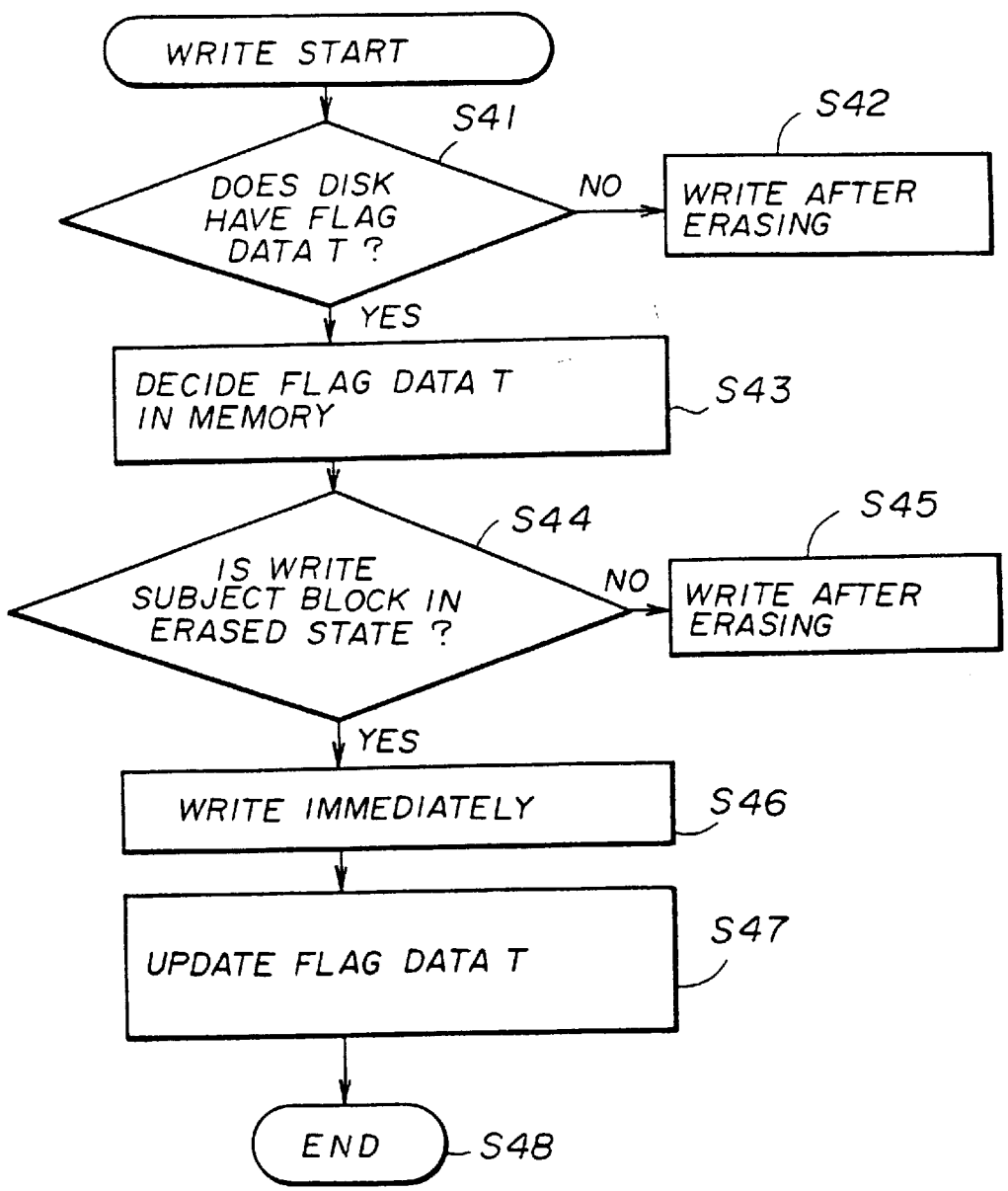
FIG. 6 is another flowchart illustrating the operation of the first embodiment of the present invention.

FIG. 6 is a flowchart of a procedure for writing data on the optical disk 1A. In step S41, the flag decision unit 110 determines whether or not the flag data B generated by the flag generator 105 has been received. If the optical disk 1A does not have the flag data T, the flag decision unit 110 outputs the corresponding output signal to the erase instruction unit 103 via an OR gate OR1. In response to receipt of the output signal from the flag decision unit 110, the erase instruction unit 103 activates the erase unit 150c, which performs the erasing operation on the corresponding block. The above-mentioned output signal of the flag decision unit 110 is applied to the write instruction unit 113 via an OR gate OR3. The write instruction unit 113 instructs the write unit 150b to write data, supplied from a host computer (which will be described later) and stored in the semiconductor memory 200, into the optical disk 1A. The above erasing and writing operation is performed in step S42 shown in FIG. 6.

When the flag data T is present, the decision unit 101 makes a decision that there is the flag area A in step S31. In this case, the decision unit 101 refers to the flag data T stored in the semiconductor memory 200 in step S43, and determines whether the flag data T related to the write subject block is 1 or 0 in step S44. When data has been recorded on the write subject block, the reference unit 102 outputs the corresponding output signal to the erase instruction unit 103 via the OR gate OR1. The erase instruction unit 103 outputs the erase instruction to the erase unit 150c. Further, the erase instruction unit 103 outputs the output signal to the write instruction unit 104 via the OR gate OR2. The write instruction unit 104 reads data from the semiconductor memory 200 and outputs the read data to the write unit 150b. The above erasing and writing operation is performed in step S45.

When it is determined, in step S44, that the write subject block is already in the erased state, the reference unit 102 outputs the corresponding output signal to the write instruction unit 104 via the OR gate OR2. In step S46, the write instruction unit 104 reads data from the semiconductor memory 200 and outputs the read data to the write unit 150b without an erasing operation. After step S45 or step S46 is executed, the write instruction unit 104 activates the rewrite instruction unit 201, which updates the flag data T in the semiconductor memory 200 in step S47.

Figure 7:
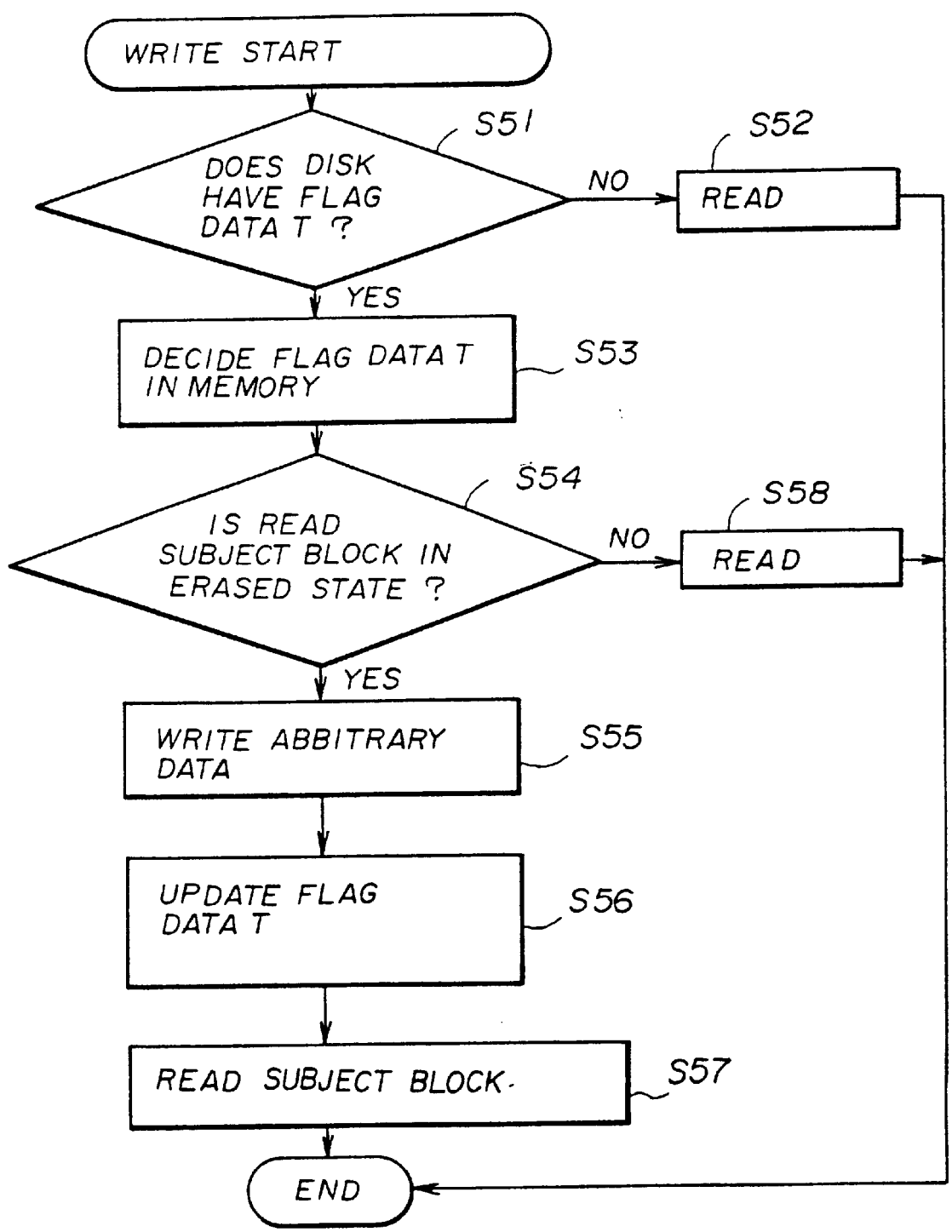
FIG. 7 is yet another flowchart illustrating the operation of the first embodiment of the present invention.

FIG. 7 is a flowchart of a procedure for reading data from the optical disk 1A. In step S51, the flag decision unit 101 refers to the flag B and determines whether or not the flag data T is present on the optical disk 1A. When the result of step S51 is NO, the decision unit 101 activates the read instruction unit 113, which reads data recorded on the read subject block in step S52. When it is determined that the flag data T exists on the optical disk 1A, the decision unit 101 activates the reference unit 102, which refers to the flag data T related to the read subject block and stored in the semiconductor memory 200 in step S53, and determines whether the flag data T related to the read subject block is 1 or 0 in step S54.

When it is determined that the read subject block is not in the erased state, the reference unit activates the read instruction unit 113 via the OR gate OR3. Then, the read instruction unit 113 activates the read unit 150a, which reads data from the read subject block in step S58. If it is determined, in step S54, that the read subject block is in the erased state, an error correction code (ECC) error will occur and hence correct reading will not be performed. Hence, if the result of step S54 is YES, the reference unit 102 activates the write instruction unit 104 via the OR gate OR2, and the write instruction unit 104 writes arbitrary data on the read subject block in step S55. In step S56, the write instruction unit 104 activates the rewrite instruction unit 201, which updates the flag data T related to the read subject block so that it shows that the read subject block is not in the erased state. Then, the reference unit 102 refers to the updated flag data T, and determines that the read subject block is not in the erased state. Then, the reference unit 102 activates the read instruction unit 113 via the OR gate OR3, and the read instruction unit 113 activates the read unit 150a, which reads data from the read subject block in step S57.

It is necessary to record the updated flag data T stored in the semiconductor memory 200 on the flag area A of the optical disk 1A. The updating of the flag area A can be performed each time the writing is performed. However, this process increases overhead and needs a long time to complete the write operation. Hence, it is preferable to update the flag area A with the updated flag data T during an idle time of the optical disk apparatus in which reading or writing of data is not being performed. Alternatively, the flag area A can be updated immediately before the optical disk 1A is ejected from the optical disk apparatus.

It is also possible to record, on a data area C in the semiconductor memory 200, information concerning blocks switched to a recorded state from the erased state. For example, information specifying identification numbers of these blocks is stored in the data area C. The updating operation on the flag area A refers only to the data area C in the semiconductor memory 200, and is performed during the idle time or immediately before the optical disk 1A is ejected. With the above procedure, it is possible to reduce the time necessary to update the flag area A. After the flag area A is updated by referring to the flag data T stored in the data area C in the semiconductor memory 200, the data area C is cleared. In the updating operation, only the flag data related to the blocks identified by the identification block numbers can be updated.

In order to prevent the user from accidentally destroying the flag data T in the flag area A, it is preferable to form the flag area A in the ROM area 10b. Normally, data is not allowed to be written into or read from the ROM area 10b. Hence, it is necessary to provide the optical disk apparatus with the function for writing the flag data T into the ROM area 10b and reading the flag data T therefrom. In this case, if there are pits in the flag data T in the flag area A on the optical disk 1A, it is likely that noise will be superimposed on a magneto-optical signal. With the above in mind, the flag area A in the ROM area 10b is designed so that it does not have pits.

According to the optical disk and the optical disk apparatus, data can be written without performing the erasing operation, and hence it is possible to reduce the time necessary to write data at high speed. However, the number of blocks in the erased state is reduced during the read and write operation, and thus the above advantage of the present invention is gradually decreased. In order to eliminate the above problem, it is preferable to provide the optical disk apparatus with the following initializing function.

All blocks in the user accessible area 10 except for a minimum number of necessary blocks are put in the erased state, and the flag data T is written into the flag area A. Further, the optical disk apparatus is equipped with the function of setting the area data E.

Figure 8:
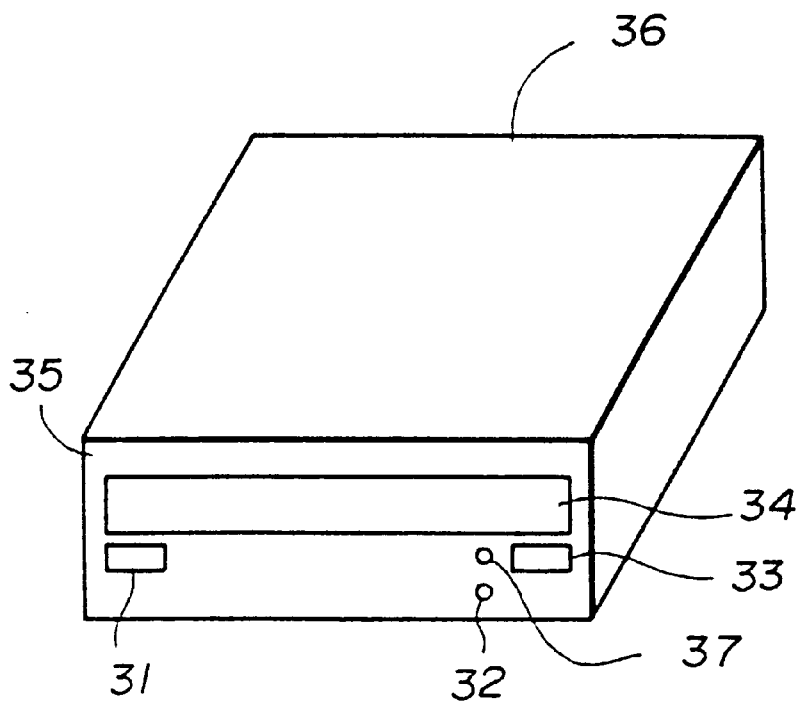
FIG. 8 is a perspective view of a second embodiment of the present invention.
Figure 10:
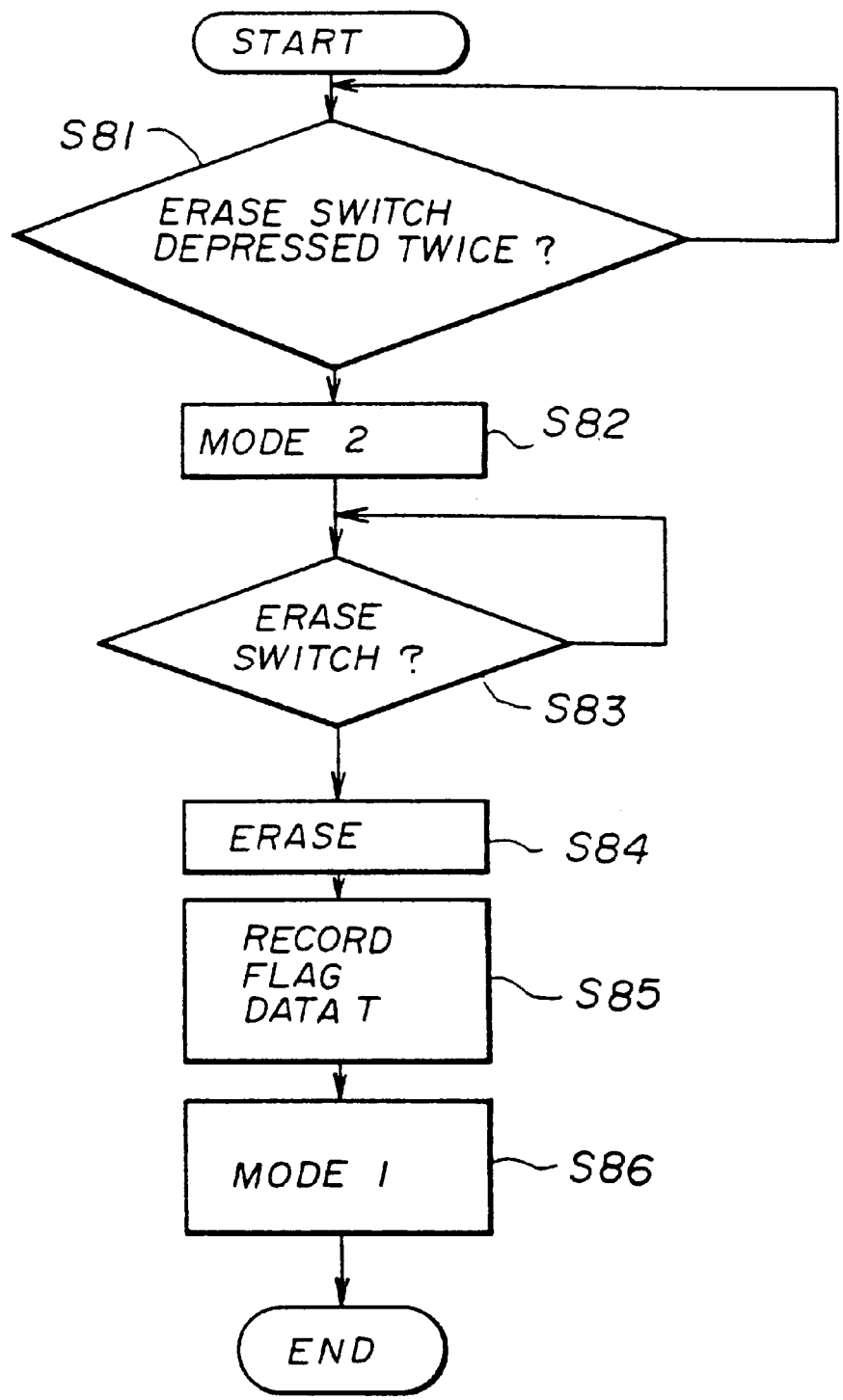
FIG. 10 is a flowchart illustrating the operation of the second embodiment of the present invention.

FIG. 8 is a perspective view of an optical disk apparatus taking into account the above according to a second embodiment of the present invention. FIG. 9 is a block diagram of an essential part of the second embodiment of the present invention, and FIG. 10 is a flowchart illustrating the operation of the second embodiment of the present invention. A controller of the second embodiment of the present invention includes the structural elements of the controller 100 shown in FIG. 4 and the structural elements shown in FIG. 9. Alternatively, it is possible to replace the controller 100 shown in FIG. 4 with the structure shown in FIG. 9. Further, the second embodiment of the present invention includes the engine unit 150 and the semiconductor memory 200 shown in FIG. 4. In FIG. 8, an erase switch 31, a local-state indicator 32, an eject switch 33, a disk inserting opening 34, and an access indicator 37 are formed on a front panel 35 of a casing 36 of the optical disk apparatus.

As shown in FIG. 9, the second embodiment of the present invention includes a mode switching unit 300, which selects either a normal mode M1 or an initialization mode M2. In the normal mode M1, the controller 100 operates under the control of the host computer (not shown in FIG. 9). In the initialization mode M2, the controller 100 does not operate under the control of the host computer. When the erase switch 31 is depressed, the mode switching unit 300 prepares to switch to the initialization mode M2. When the erase switch 31 is depressed again, a number-of-times decision unit 305 activates a mode setting unit 306, which specifies the initialization mode M2 in steps S81 and S82. Hence, a local state is established in which the optical disk apparatus is in the disk ejected state with respect to the host computer. In other words, the controller 100 is maintained in a state in which the controller 100 is disconnected from the host computer. In this case, the local state indicator 32 is turned ON in response to the output signal of the mode switching unit 306.

When the erase switch 31 is further depressed (for a total of three times), the erase instruction unit 103 starts to operate and activates the erase unit 150c in step S84, in which all the blocks except for the minimum number of necessary blocks. In step S85, the write instruction unit 202 is activated and writes the flag data T into the flag area A via the write unit 150b. Thereafter, the mode setting unit 306 is informed of the completion of writing of the flag data T, and changes the mode from the initialization mode to the normal mode in step S86. Further, the mode setting unit 306 turns the local state indicator 32 off.

Figure 11:
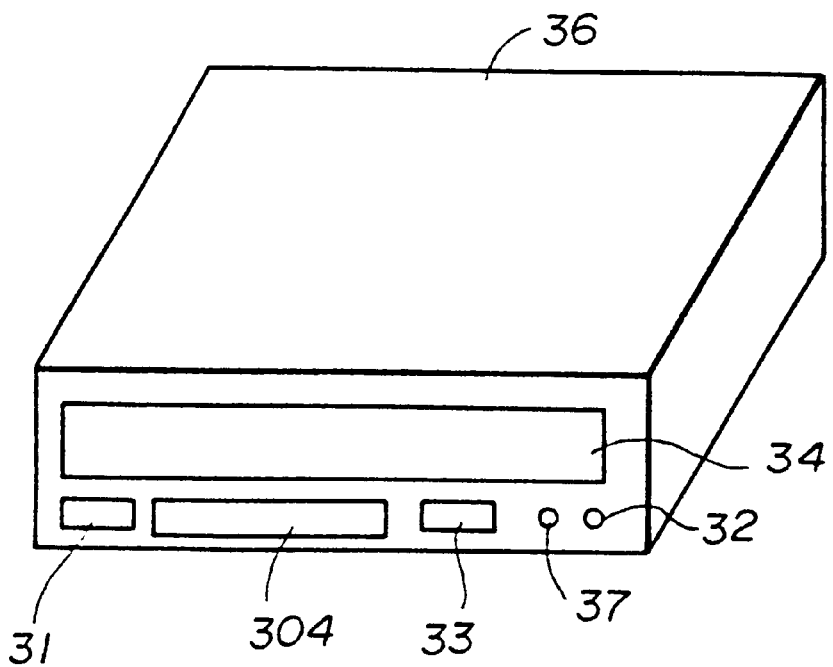
FIG. 11 is a perspective view of a third embodiment of the present invention.
Figure 12:
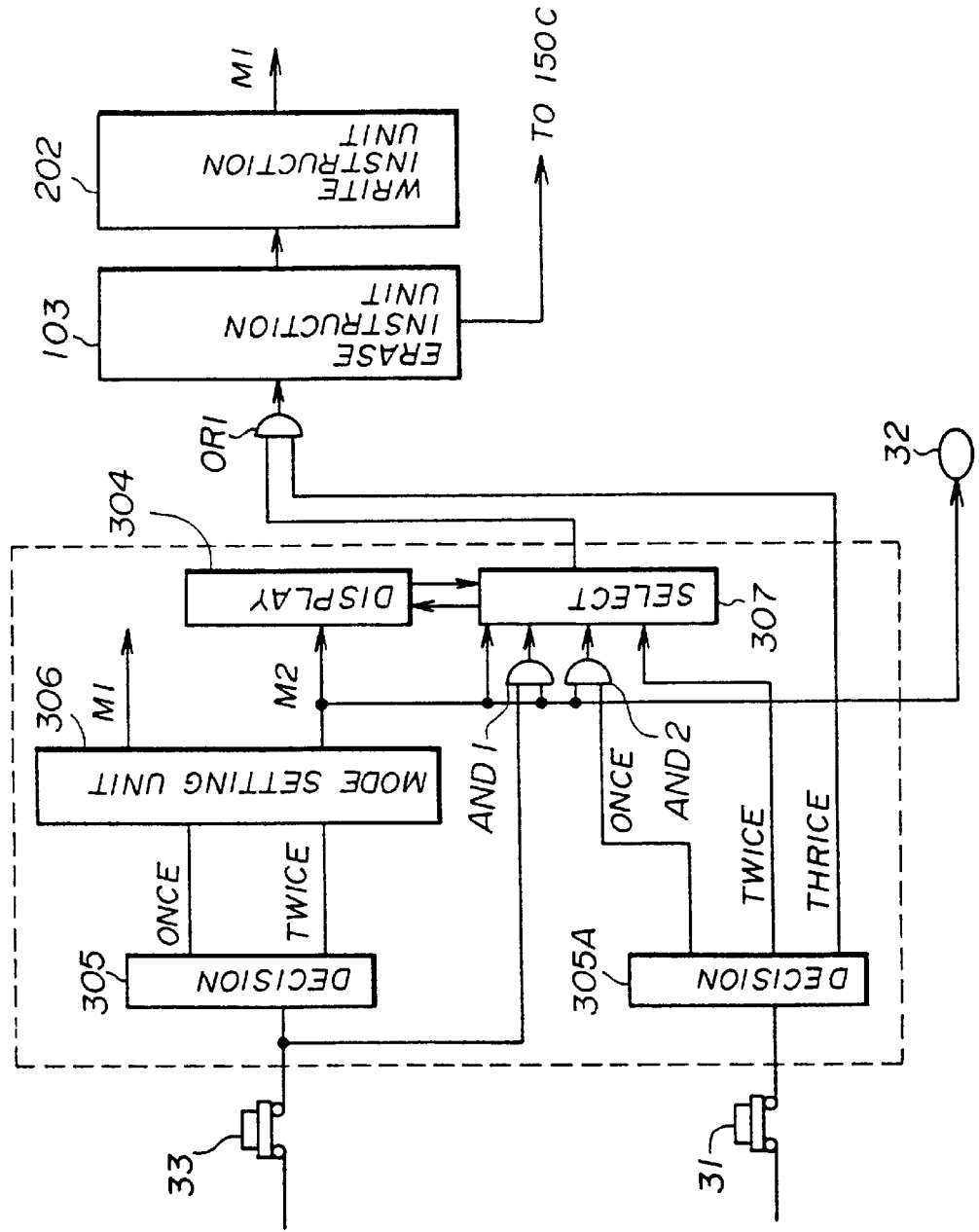
FIG. 12 is a block diagram of an essential part of the third embodiment of the present invention.
Figure 13:
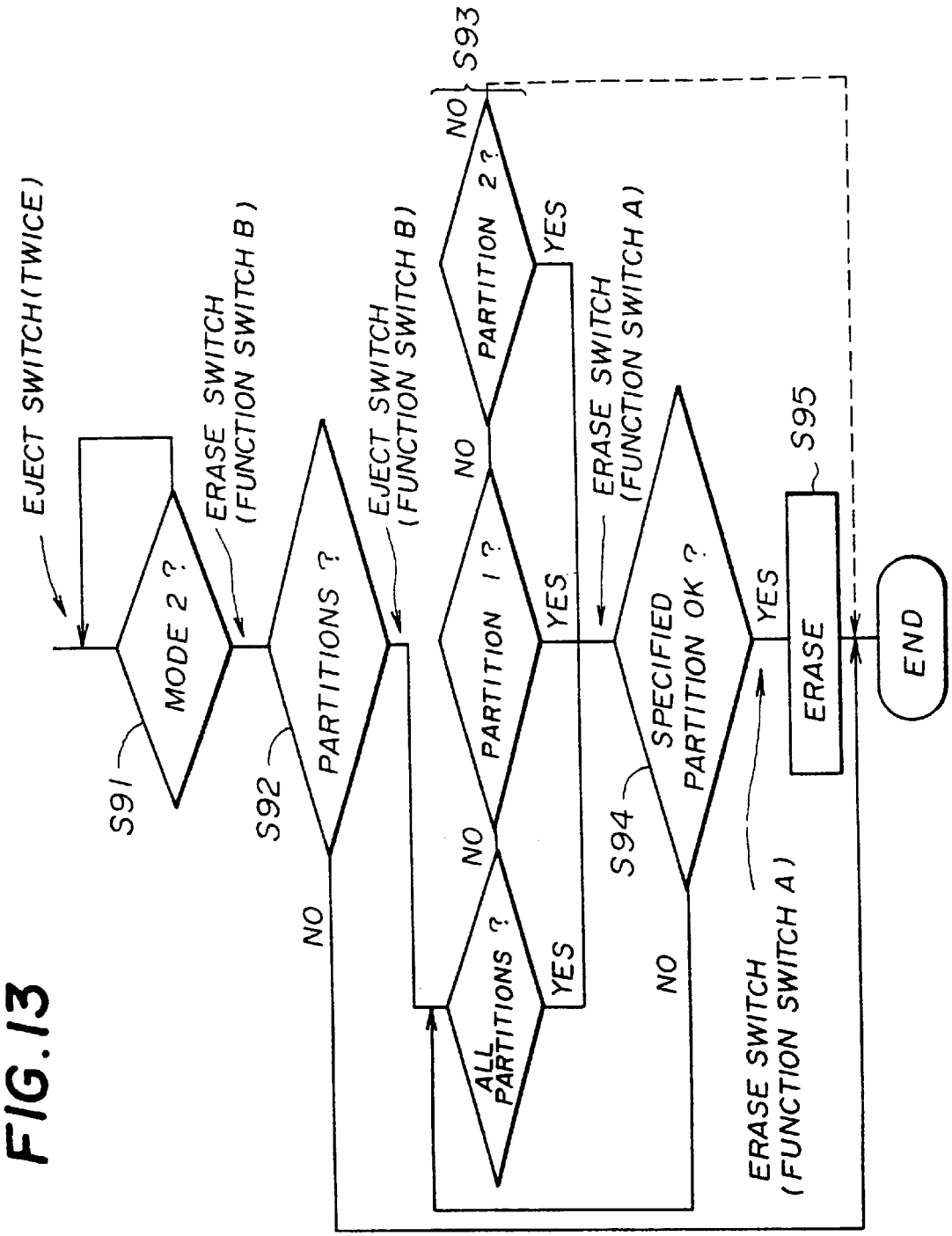
FIG. 13 is a flowchart illustrating the operation of the third embodiment of the present invention.

FIG. 11 is a perspective view of an optical disk apparatus according to a third embodiment of the present invention. FIG. 12 is a block diagram of an essential part of the controller 100 used in the third embodiment of the present invention. FIG. 13 is a flowchart illustrating the operation of the third embodiment of the present invention. In FIGS. 12 and 13, parts that are the same as parts shown in the previously described figures are given the same reference numbers. A mode switching unit 300A of the third embodiment of the present invention is added to the controller 100 shown in FIG. 4. Alternatively, the structure shown in FIG. 12 can be substituted for the controller 100. Further, the third embodiment of the present invention includes the engine unit 150 and the semiconductor memory 200 shown in FIG. 4.

The mode switching unit 300A can specify either the normal mode M1 under the control of the host computer, or the initialization mode M2. When the eject switch 33 is depressed once, the optical disk 1A is ejected from the disk inserting opening 34. When the eject switch 33 is depressed twice successively, the number-of-times decision unit 305 activates the mode setting unit 306, which sets the initialization mode M2 and turns the local-state indicator 32 ON in step S91. In the initialization mode, the erase switch 31 and the eject switch 33 function as function switches A and B, respectively.

When the function switch A (erase switch 31) is depressed, a number-of-times decision unit 305A activates a selecting unit 307 via an AND gate AND2, which also receives the initialization mode setting signal (a high-level signal). The selecting unit 307 analyzes information concerning a partition structure of the optical disk 1A read by the read unit 150a, and identifies the number of partitions in step S92. Each time the function switch B (eject switch 33) is depressed in the above state, the partition to be subjected to the erasing operation is indicated on a display unit 304 formed with, for example, a liquid crystal display in step S93. In this case, the output signal of the function switch B passes through an AND gate AND1, and is applied to the selecting unit 307. Further, the display unit 304 indicates "are you sure the ith partition is deleted?" when the function switch B is depressed i times where i is an integer. When the function switch A (erase switch 31) is depressed again in the above state in step S94, the number-of-times decision unit 305A outputs an erase request signal to the erase instruction unit 103 via the selecting unit 307 and the OR gate OR1 in steps S94 and S95.

If the entire optical disk 1A should be subjected to the erasing operation, the erase unit 150c erases data from all the blocks except for the minimum number of necessary blocks, and the flag data T is written into the flag area A by the write instruction unit 202. When one or more partitions should be subjected to the erasing operation, the erase unit 150c erases data from one or some partitions, and the flag data T is written into the flag area A by the write instruction unit 202. When the erasing operation is completed, the controller 100 (FIG. 4) is automatically switched to the normal mode.

According to the second and third embodiments of the present invention, it is possible to write data on the optical disk at high speed independently of the operating system of the host computer. Further, it is possible to write data onto the conventional optical disk not having the flag area A, and read data therefrom. Furthermore, there is no problem when the optical disk according to the present invention is loaded in a conventional optical disk apparatus.

Moreover, the erasing operation can be carried out for optical disks on which data has been recorded by employing the aforementioned initialization mode. Further, the initialization process can be performed independently of the operation of the host computer. Also during the erasing operation, the host computer can process an arbitrary instruction or event. Furthermore, it is possible to cope with various needs because all or part of the optical disk can be subjected to the erasing operation.

Figure 14A:
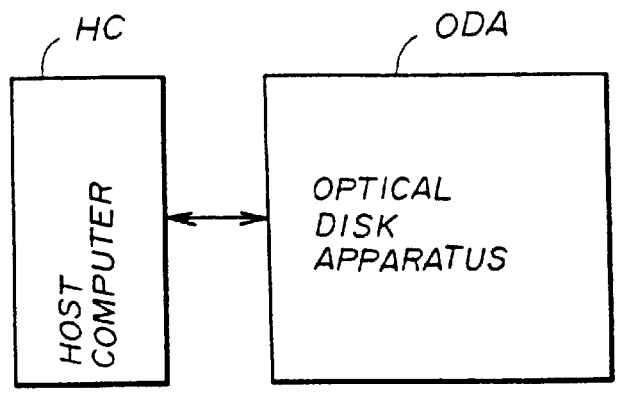
FIG. 14A is a block diagram of a connection between a host computer and the optical disk apparatus of the present invention.

The optical disk apparatus according to the present invention is connected to a host computer, as shown in FIG. 14A, in which HC indicates the host computer, and ODA indicates the optical disk apparatus.

Figure 14B:
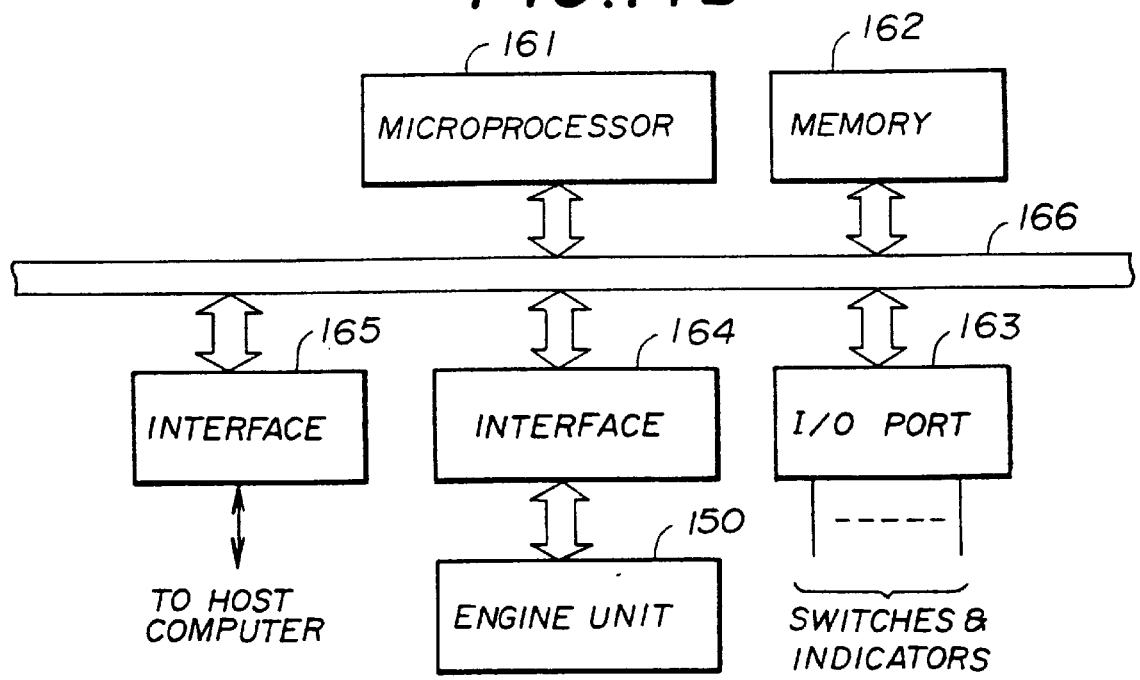
FIG. 14B is a block diagram of an electronic system of the optical disk apparatus.

The optical disk apparatus ODA has an electronic system shown in FIG. 14B. The electronic system shown in FIG. 14B includes a microprocessor 161, a semiconductor memory 162, an I/O (input/output) port 163, an interface unit 164, and an interface unit 165, these structural elements being coupled to each other via a bus 166. The microprocessor 161 corresponds to the aforementioned controller 100, and the semiconductor memory 162 corresponds to the aforementioned semiconductor memory 200. The I/O port 163 drives the indicators and display unit, and receives the output signals of the switches. The interface unit 164 establishes an interface between the microprocessor 161 and the engine unit 150. The interface unit 165 establishes an interface between the microprocessor 161 and the host computer HC.

Figure 14C:
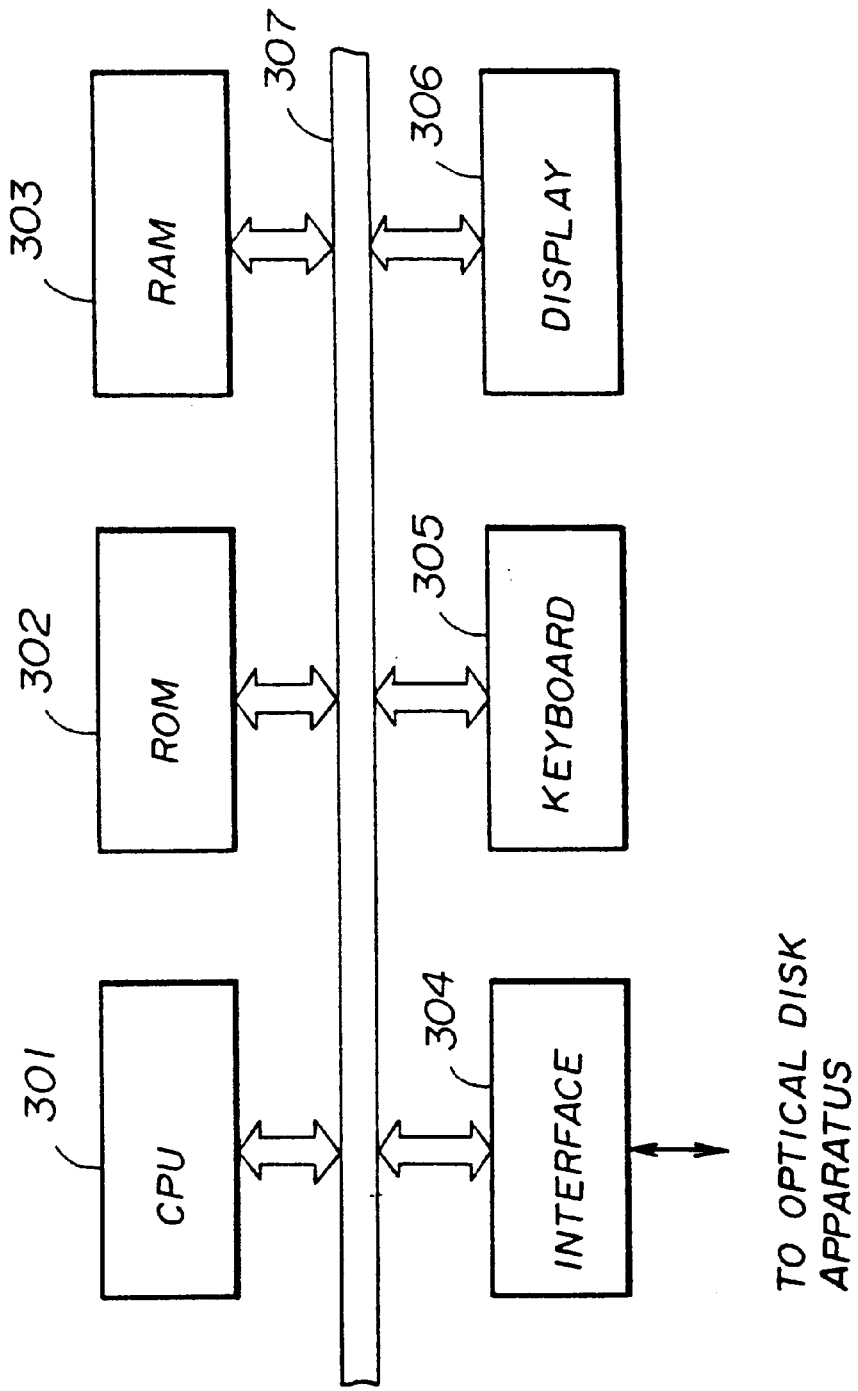
FIG. 14C is a block diagram of the hardware structure of the host computer.

FIG. 14C is a block diagram of the host computer HC. As shown in FIG. 14C, the host computer HC is made up of a CPU 301, a ROM 302, a RAM 303, an interface unit 304, a keyboard 305, and a display unit 305, these structural elements being coupled to each other via a bus 307. The optical disk apparatus ODA is connected to the host computer HC via the interface unit 304. Programs defining the aforementioned operation of the host computer HC are stored in the ROM 302. The RAM 303 functions as a work memory of the CPU 301. Data to be recorded on the optical disk 1A is transferred to the optical disk apparatus ODA via the interface unit 304. An external storage device can be connected to the host computer HC via the interface unit 304. Data read from the optical disk 1A is received by the host computer via the interface unit 304. Further, various instruction commands, such as write, read and erase instruction commands, are transferred to the optical disk apparatus ODA via the interface unit 304. In response to receipt of a command, such as the write instruction command, the decision unit 101 can be activated. The decision unit 101 can also be activated in the initialization mode.

The present invention is not limited to the specifically disclosed embodiments, and variations and modifications may be made without departing from the scope of the present invention.

What is claimed is:

1. An optical disk apparatus for an optical disk including a user accessible area having a plurality of blocks and a flag area storing flag data indicating whether or not each of the blocks is in an erased state, said optical disk apparatus comprising:

a semiconductor memory; and a controller reading out the flag data from the optical disk and storing the flag data into said semiconductor memory.

2. An optical disk apparatus connectable with a host computer which issuing a write command with a data to the optical disk apparatus and accessible to an optical disk including a user accessible area having a plurality of blocks, said optical disk apparatus comprising:

storing means for storing a flag data indicating whether or not each of the blocks is in an erased state;

first means for determining whether or not a block to be written the data and specified in the issued write command is in erased state, in accordance with referring the flag data; and second means for processing of writing the data to the specified block without an operation of erasing the specified block before the writing, where the first means has determined that the specified block is in erased state.

3. An optical disk apparatus as claimed in claim 2, wherein said storing means comprises a semiconductor memory.

4. An optical disk apparatus connectable with a host computer which issues a write command with a data to the optical disk apparatus and accessible to an optical disk including a user accessible area having a plurality of blocks, said optical disk apparatus comprising:

storing means for storing a flag data indicating whether or not each of the blocks is in an erased state;

first means for determining whether or not an erasing instruction of which a specified block is to be erased is input;

second means for processing an erasing operation which the specified block is to be in erased state where the erasing instruction is input; and third means for renewing said storing means so that a flag data corresponding to the specified block indicates that the specified block is in erased state in accordance with the erasing operation.

5. A computer system, comprising:

a host computer issuing a write command with a data; and an optical disk apparatus receiving the write command with the data and accessible to an optical disk with a user accessible area having a plurality of blocks and a flag area storing flag data indicating whether or not each of the blocks is in an erased state, said optical disk apparatus including:

a semiconductor memory; and a controller reading out the flag data from the optical disk and storing the flag data into said semiconductor memory.

6. A computer system accessible to an optical disk with a user accessible area having a plurality of blocks, comprising:

a host computer issuing a write command with a data to be written into a specified block of an optical disk;

an optical disk apparatus receiving the write command with the data and receiving a flag data indicating whether or not the specified block for the data is in an erased state;

a memory storing a flag data indicating whether or not each of specified blocks is in an erased state; and a controller reading out the flag data for the specified block for the data from said memory.

7. A computer system, comprising:

a host computer issuing a write command with a data; and an optical disk apparatus receiving the write command with the data and accessible to an optical disk with a user accessible area having a plurality of blocks, said optical disk apparatus including:

storing means for storing a flag data indicating whether or not each of the blocks is in an erased state, first means for determining whether or not a block to be written the data and specified in the issued write command is in erased state, in accordance with referring the flag data, and second means for processing of writing the data to the specified block without an operation of erasing the specified block before the writing, where the first means has determined that the specified block is in erased state.

8. A computer system, comprising:

a host computer issuing a write command with a data;

an optical disk apparatus receiving the write command with the data and accessible to an optical disk with a user accessible area having a plurality of blocks;

storing means for storing a flag data indicating whether or not the blocks are in an erased state;

first means for determining whether or not a block to be written the data and specified in the issued write command is in an erased state, in accordance with referring the flag data; and second means for processing of writing the date to the specified block without an operation of erasing the specified block before the writing, where the first means has determined that the block is in an erased state.

9. A computer system, comprising:

a host computer issuing a write command with a data; and an optical disk apparatus receiving the write command with the data and accessible to an optical disk with a user accessible area having a plurality of blocks, said optical disk apparatus including:

storing means for storing a flag data indicating whether or not each of the blocks is in an erased state, first means for determining whether or not an erasing instruction of which a specified block is to be erased is input, second means for processing an erasing operation which the specified block is to be in an erased state where the erasing instruction is input, and third means for renewing said storing means so that a flag data corresponding to the specified block indicates that the specified block is in an erased state in accordance with the erasing operation.

10. A computer system, comprising:

a host computer issuing a write command with a data;

an optical disk apparatus receiving the write command with the data and accessible to an optical disk with a user accessible area having a plurality of blocks;

storing means for storing a flag data indicating whether or not the blocks are in an erased state;

first means for determining whether or not an erasing instruction of which a specified block is to be erased is input;

second means for processing an erasing operation which the block is to be in erased state where the erasing instruction is input; and third means for renewing said storing means so that a flag data corresponding to the block indicates that the block is in an erased state in accordance with the erasing operation.

11. A method for accessing to an optical disk having a plurality of blocks comprising:

receiving a write command with a data to be written into a specified block of the optical disk;

receiving a flag data indicating that the specified block is in an erased state in which there is no record data; and processing of writing the data to the specified block without an operation of erasing the specified block before the writing, where the flag data has been received for the data to be written in the specified block.

12. A method for accessing to an optical disk having a plurality of blocks comprising:

receiving a write command with a data to be written into a specified block of the optical disk;

receiving a flag data indicating that the block is in an erased state in which there is no record data; and processing of writing the data to the specified block without an operation of erasing the specified block before the writing, where the flag data has been received.

* * * * *

UNITED STATES PATENT AND TRADEMARK OFFICE
CERTIFICATE OF CORRECTION

PATENT NO.: 6,011,764
DATED : January 4, 2000
INVENTOR(S): Satoshi ITAMI

It is certified that error appears in the above-identified patent and that said Letters Patent is hereby corrected as shown below:

<u>On the cover page</u>:

In Item [75], change "Satoshi Itami; Masaru Nakahara; Masahiro Nakada; Hiroshi Suzuki; Kenichi Utsumi, all of Kawasaki, Japan" to --Satoshi Itami, of Kawasaki, Japan --.

Signed and Sealed this

Nineteenth Day of December, 2000

Attest:

Q. TODD DICKINSON

*Attesting Officer*     *Commissioner of Patents and Trademarks*